United States Patent [19]

Fujii et al.

[11] Patent Number: 5,075,267
[45] Date of Patent: Dec. 24, 1991

[54] LIGHT TRANSMITTING YTTRIA SINTERED BODY AND ITS PREPARATION

[75] Inventors: Akihito Fujii; Kenichiro Shibata, both of Itami, Japan

[73] Assignee: Sumitomo Electric Industries, Ltd., Osaka, Japan

[21] Appl. No.: 487,117

[22] Filed: Mar. 2, 1990

[30] Foreign Application Priority Data

Mar. 3, 1989 [JP] Japan ..................................... 1-51486

[51] Int. Cl.$^5$ ...................... C04B 35/02; C04B 35/50; C04B 35/51; C04B 35/16
[52] U.S. Cl. ...................................... 501/126; 501/94; 501/152; 264/56; 264/65
[58] Field of Search .................... 501/152, 94, 126; 264/65, 1.2, 56, 66; 106/73.2, 39

[56] References Cited

U.S. PATENT DOCUMENTS

| | | | |
|---|---|---|---|
| 3,545,987 | 12/1970 | Anderson | 106/73.2 |
| 3,764,643 | 10/1973 | Muta et al. | 264/65 |
| 3,873,657 | 3/1975 | Toda et al. | 264/56 |
| 4,115,134 | 9/1978 | Rhodes | 106/73.2 |
| 4,166,831 | 9/1979 | Rhodes et al. | 264/1 |
| 4,761,390 | 8/1988 | Hartnett et al. | 501/152 |

FOREIGN PATENT DOCUMENTS 0277811 8/1988 European Pat. Off. .
2342910 8/1972 Fed. Rep. of Germany .

*Primary Examiner*—William R. Dixon, Jr.
*Assistant Examiner*—Michael Marcheschi
*Attorney, Agent, or Firm*—Cushman, Darby & Cushman

[57] ABSTRACT

A light transmitting yttria sintered body having good light transmission, can be prepared by a method of preparing a light transmitting yttria sintered body which comprises steps of densifying yttria powder having purity of not lower than 99.9% and a BET specific surface area of not smaller than 10 m$^2$/g by a hot press at a temperature of 1300° to 1700° C. under a pressure of 100 to 500 kg/cm$^2$ in a vacuum circumstance so as to achieve the theoretical density ratio of not lower than 95% and then hot isotropically pressing densified yttria at a temperature of 1400° to 1900° C. under a pressure of not lower than 500 kg/cm$^2$.

4 Claims, No Drawings

LIGHT TRANSMITTING YTTRIA SINTERED BODY AND ITS PREPARATION

BACKGROUND OF THE INVENTION

1. Field of the Invention

The present invention relates to a polycrystalline yttria sintered body with good light transmission, particularly a light transmitting yttria sintered body suitable for an infrared transmitting window which has a thickness of not smaller than 3 mm, and a method for preparing the same.

2. Description of the Related Art

Since yttria ($Y_2O_3$) has a cubic system crystal structure at a temperature of not higher than 2350° C., it has low scattering at crystal grain boundaries and exhibits good light transmission when sintered at a high density.

Usually, light transmission of the yttria sintered body sharply increases around a wavelength of 0.3 μm in a visible region and reaches the maximum value around a wavelength of 3 to 7 μm in an infrared region. Therefore, the yttria sintered body is a promising light transmitting material such as an optical window and is manufactured by various methods.

For example, Japanese Patent Kokai Publication No. 17911/1979 discloses a method which comprises adding lanthanum oxide ($La_2O_3$) as a sintering aid and effecting the sintering under a low oxygen atmosphere and Japanese Patent Kokai Publication No. 17910/1979 discloses a method which comprises using alumina as a sintering agent and effecting the sintering under a low oxygen atmosphere. Further, U.S. Pat. No. 3,878,280 discloses a method which comprises hot pressing yttria powder under reduced pressure.

However, in the conventional methods for preparing the light transmitting yttria sintered body by using such sintering aid, a second phase tends to form partially due to the presence of the sintering aid such as $La_2O_3$ which is added for densifying the sintered body, the transmission decreases by the scattering of the light due to ununiformity of the texture and an optically uniform block of a large size cannot be obtained. In hot pressing under vacuum, since it is difficult to apply high pressure of not lower than 500 kg/cm² because of the strength of a graphite mold, sufficient densification cannot proceed and then the transmission is low.

In the light transmitting yttria sintered bodies prepared by these conventional methods, a straight transmission is at most about 80% at a wavelength of 2 to 6 μm when a sample thickness is 2.5 mm. In order to use the yttria sintered body as the material for an infrared transmitting window which usually has a thickness of not smaller than 3 mm, it is necessary to increase the straight transmission.

SUMMARY OF THE INVENTION

An object of the present invention is to provide a light transmitting yttria sintered body which has a high purity, a high density and a high light transmission, particularly straight transmission suitable for the infrared transmitting window material having the thickness of not smaller than 3 mm, and a method of preparing the yttria sintered body.

This and other objects are achieved by a method of preparing a light transmitting yttria sintered body which comprises steps of densifying yttria powder having purity of not lower than 99.9% and a BET specific surface area of not smaller than 10 m²/g by a hot press at a temperature of 1300° to 1700° C. under a pressure of 100 to 500 kg/cm² in a vacuum circumstance so as to achieve a theoretical density ratio of not lower than 95% and then hot isotropically pressing densified yttria at a temperature of 1400° to 1900° C. under a pressure of not lower than 500 kg/cm².

The light transmitting yttria sintered body according to the present invention prepared by the above method, comprises a polycrystalline yttria sintered body having purity of not lower than 99.9%, and has a straight transmission of not lower than 75% on the average with the visible and near infrared light having a wavelength of 0.4 to 3 μm and a straight transmission of not lower than 80% with the medium infrared light having a wavelength of 3 to 6 μm when a yttria sample has a thickness of 3 mm. It has good straight transmission which is not hitherto achieved, and is suitable for an infrared transmission window material.

DETAILED DESCRIPTION OF THE INVENTION

By the hot press under vacuum and the subsequent HIP (hot isotropic press) treatment, the yttria sintered body having the high density and the spatially uniform high straight transmission can be produced without adding the sintering aid such as $La_2O_3$.

The yttria powder as the starting material has the purity of not lower than 99.9% so as to prevent the decrease of transmission due to absorption by impurities. It is not preferable that the yttria powder contains a transition metal such as Fe. A primary particle of the yttria powder has a particle size of not larger than 0.2 μm, namely the BET specific surface area of not smaller than 10 m²/g so as to obtain the dense sintered body which has a small crystal particle size of not larger than 30 μm. The BET value is preferably from 10 to 30 m²/g.

As the fine yttria powder having high purity, yttria powder resulted from hydrolysis of an alkoxide is preferable.

According to the method of the present invention, the transmission decrease and spatial scattering due to the presence of the second phase found in the conventional sintered body are prevented since the addition of the sintering aid such as $La_2O_3$ is not required.

In the method of the present invention, the hot press is carried out in the vacuum circumstance at the temperature of 1300° to 1700° C. under the pressure of 100 to 500 kg/cm². When the temperature is lower than 1300° C., it is difficult to produce the highly dense sintered body having the theoretical density ratio of not lower than 95%. When the temperature is higher than 1700° C., it is difficult to produce the optically uniform sintered body since oxygen ions in $Y_2O_3$ dissipate from the sample surface and the atomic ratio changes. When the hot press pressure is lower than 100 kg/cm², it is difficult to produce the highly dense sintered body having the theoretical density ratio of not lower than 95%. When the pressure is higher than 500 kg/cm², it is difficult to use a usual graphite mold in view of strength of the mold.

In the HIP treatment, the sintered body is isotropically pressed at the temperature of 1400° to 1900° C. under the pressure of not lower than 500 kg/cm². Therefore, the removal of voids are promoted by the plastic deformation and diffusion, and the density and the light transmission increase. A high pressure gas to be used in the HIP treatment is preferably an inert gas such as Ar, nitrogen gas, oxygen gas or a mixture of these gases. When oxygen gas is mixed, it is possible to prevent the the decrease of light transmission caused by the dissipation of oxygen atoms from the sintered body during the HIP treatment. Since these gases have the high pressure of not lower than 500 kg/cm$^2$ (not higher than 2000 kg/cm$^2$) and act isotropically, densification by the removal of voids proceed more uniformly than the conventional hot pressing method (pressurizing in two direction, namely upward and downward at 500 kg/cm$^2$). Therefore, the optically uniform yttria sintered body having high light transmission can be obtained.

When the sintered body after the hot press has the theoretical density ratio of lower than 95%, many of the remaining voids form so-called open voids and the high pressure gas used in the HIP treatment penetrates in the sintered body through such voids. Then densification by the HIP treatment cannot proceed sufficiently.

According to the present invention, it is possible to obtain the light transmitting yttria sintered body which has high density and very good straight transmission in the visible and infrared regions and which is optically uniform even if the sintered body is a large one having the diameter of not smaller than 50 mm.

The light transmitting yttria sintered body according to the present invention is useful as an infrared transmitting window with a thickness of not smaller than 3 mm.

EXAMPLE 1

Highly pure yttria powder having purity of 99.9% and a BET specific surface area of 19 m$^2$/g was hot pressed under vacuum of $2 \times 10^{-2}$ torr for three hours by using a graphite mold having an inner diameter of 100 mm at a temperature of 1450° C. at a pressure of 300 kg/cm$^2$ to obtain a white sintered body having the theoretical density ratio of 97%. Then the sintered body was placed in an HIP instrument and HIP treated for two hours at a temperature of 1650° C. under a pressure of 2000 kg/cm$^2$ with using an Ar gas. The resultant yttria sintered body had a colorless transparent appearance.

The yttria sintered body was mirror polished to a thickness of 3 mm, and a straight transmission was determined by a spectrophotometer. The transmission was good and not lower than 85% in a wavelength region of 3 to 6 $\mu$m and 76% on the average in a wavelength region of 0.4 to 3 $\mu$m.

EXAMPLE 2

Highly pure yttria powder having purity of 99.9% and a BET specific surface area of 11 m$^2$/g was hot pressed under vacuum of $8 \times 10^{-3}$ torr for five hours by using a graphite mold having an inner diameter of 100 mm at a temperature of 1400° C. under a pressure of 200 kg/cm$^2$ to obtain a white sintered body having the theoretical density ratio of 95%. Then the sintered body was placed in an HIP instrument and HIP treated for three hours at a temperature of 1600° C. under a pressure of 1500 kg/cm$^2$ with using an N$_2$ gas. The resultant yttria sintered body had a colorless transparent appearance.

The yttria sintered body was mirror polished to a thickness of 3 mm, and a straight transmission was determined by a spectrophotometer. The transmission was good and not lower than 80% in a wavelength region of 3 to 6 $\mu$m and 75% on the average in a wavelength region of 0.4 to 3 $\mu$m.

EXAMPLE 3

Highly pure yttria powder having purity of 99.9% and a BET specific surface area of 11 m$^2$/g was hot pressed under vacuum of $1 \times 10^{-1}$ torr for one hour by using a graphite mold having an inner diameter of 80 mm at a temperature of 1550° C. under a pressure of 250 kg/cm$^2$ to obtain a white sintered body having the theoretical density ratio of 98%. Then the sintered body was placed in an HIP instrument and HIP treated for one hour at the temperature of 1700° C. under a pressure of 2000 kg/cm$^2$ with using an Ar-5% O$_2$ mixture gas. The resultant yttria sintered body had a colorless transparent appearance.

The yttria sintered body was mirror polished to a thickness of 3 mm, and a straight transmission was determined by a spectrophotometer. The transmission was good and not lower than 81.5% in a wavelength region of 3 to 6 $\mu$m and 76% on the average in a wavelength region of 0.4 to 3 $\mu$m.

What is claimed is:

1. A light transmitting yttria sintered body which comprises a polycrystalline yttria sintered body having purity of not lower than 99.9%, said body having a grain size of not larger than 30 $\mu$m, and wherein said body has a straight transmission of not lower than 75% on the average with the visible and near infrared light having a wavelength of 0.4 to 3 $\mu$m and a straight transmission of not lower than 80% with the medium infrared light having a wavelength of 3 to 6 $\mu$m when a yttria sample has a thickness of 3 mm.

2. A method of preparing a light transmitting yttria sintered body from yttria powder which possesses a purity of greater than 99.9% and a BET specific surface are of 10 m$^2$/g, said method comprising the following steps:
   (a) subjecting said yttria powder to a densifying treatment by a hot press comprising heating the yttria to a temperature of 1300° to 1700° C. under a pressure of 100 to 500 kg/cm$^2$ in the presence of a vacuum; wherein the yttria sintered body formed by said hot pressing process provides a yttria body with a theoretical density ratio of not lower than 95% ; and
   (b) treating said formed yttria body by providing a further densification treatment of hot isotropic pressing at a temperature of 1400° to 1900° C. under a pressure of not lower than 500 kg/cm$^2$.

3. A light transmitting yttria sintered body which possesses a purity of not lower than 99.9%, a grain size of no larger than 30 $\mu$m, and has a straight transmission of not lower than 75% on the average for visible and near infrared light having a wavelength of 0.4 to 3 $\mu$m and a straight transmission of not lower than 80% with the medium infrared light having a wavelength of 3 to 6 $\mu$m when the yttria body possesses a thickness of 3 mm; wherein said yttria body is formed by the process which comprises the following steps;
   (a) subjecting said yttria powder to a densifying treatment by a hot press comprising heating the yttria to a temperature of 1300° to 1700° C. under a pressure of 100 to 500 kg/cm$^2$ in the presence of a vacuum; wherein the yttria sintered body formed by said hot pressing process provides a yttria body with a theoretical density ratio of not lower than 95%; and
   (b) treating said formed yttria body by providing a further densification treatment of hot isotropic pressing at a temperature of 1400° to 1900° C. under pressure of not lower than 500 kg/cm$^2$.

4. The method according to claim 1, wherein at least one gas selected from the group consisting of an inert gas, a nitrogen gas and an oxygen gas is used in the hot isotropic pressing treatment.

* * * * *